United States Patent [19]

Rozumek

[11] Patent Number: 4,819,584
[45] Date of Patent: Apr. 11, 1989

[54] ERECTABLE BIRD FEEDER

[76] Inventor: Dennis Rozumek, 57 Mill St., Middleton, Mass. 01949

[21] Appl. No.: 119,792

[22] Filed: Nov. 12, 1987

[51] Int. Cl.4 .............................................. A01K 39/00
[52] U.S. Cl. .................................................. 119/51 R
[58] Field of Search ..................... 119/23, 51 R, 52 R; 40/607, 606, 610; 248/155.5, 155.4, 155.2

[56] References Cited

U.S. PATENT DOCUMENTS

| | | | |
|---|---|---|---|
| 1,673,758 | 6/1928 | Partlow | 119/52 R |
| 1,891,042 | 12/1932 | Benoit | 119/52 R |
| 2,193,747 | 3/1940 | Thompson | 40/145 |
| 2,277,420 | 3/1942 | Stanfield | 119/52 R |
| 2,487,087 | 11/1949 | Anderson | 119/51 R |
| 2,891,508 | 6/1959 | Bower | 119/51 R |
| 3,157,159 | 11/1964 | Koistinen et al. | 119/52 |
| 3,367,632 | 2/1968 | Vail | 119/23 |
| 3,696,792 | 10/1972 | Bruhns | 119/23 |
| 3,986,480 | 10/1976 | Vail | 119/23 |

FOREIGN PATENT DOCUMENTS 2127266  4/1984  United Kingdom ............. 119/51 R Primary Examiner—Robert Peshock
Assistant Examiner—R. Thomas Price
Attorney, Agent, or Firm—Kenway & Crowley

[57]  ABSTRACT

An erectable bird feeder which may be lowered for the filling or replenishment of bird feed and elevated to a fixed position for feeding use. The elevating mechanism includes fixed and pivotable support members connected by a hinge which may be locked to hold the feeder in working position. The pivotable member carries a baffle and frame from which the bird-feeding station is suspended. The disposition of the hinge relative to the station is such that the station remains level in all positions.

2 Claims, 1 Drawing Sheet

U.S. Patent                Apr. 11, 1989                4,819,584
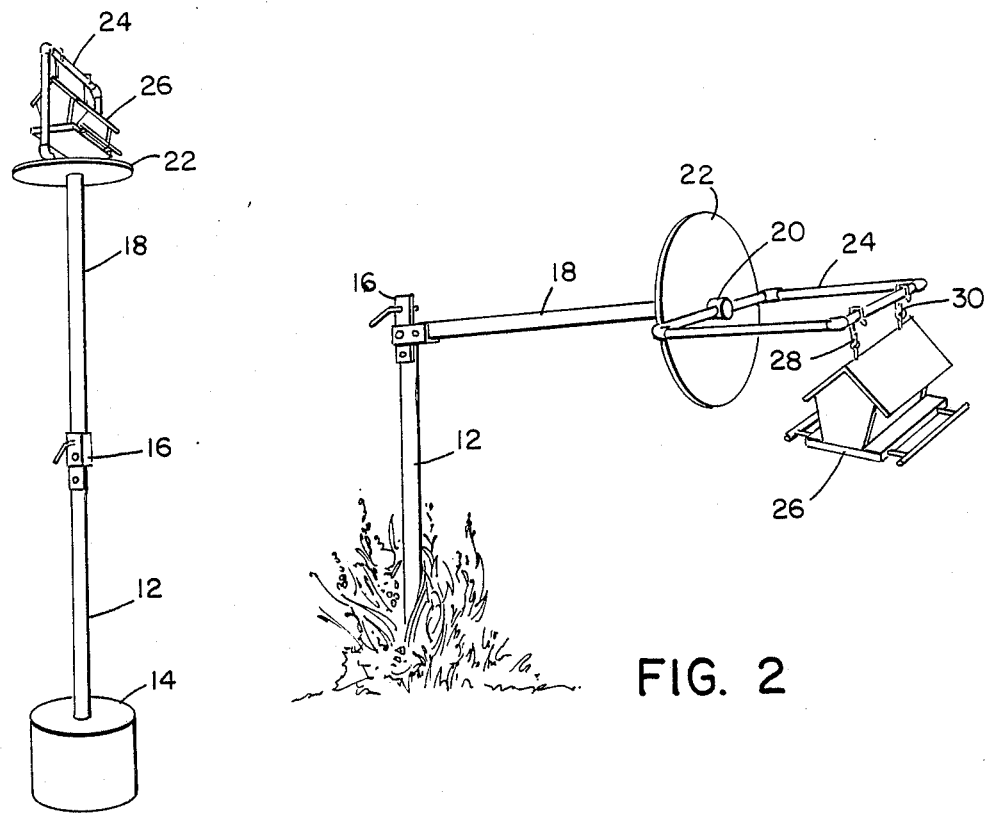
FIG. 1
FIG. 2
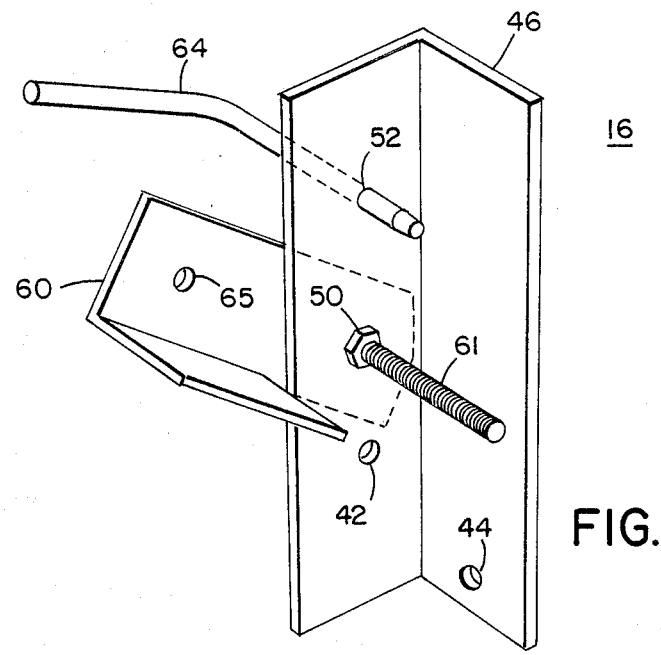
FIG. 3

ERECTABLE BIRD FEEDER

This invention relates in general to bird feeders and in particular to a bird feeder which is easily reached for filling purposes but inaccessible to unwanted animals, especially squirrels and other rodents.

BACKGROUND OF THE INVENTION

Most people enjoy having birds, particularly song birds, on their property. To attract birds, and actually to keep them alive when the ground is covered with snow, it is customary to provide food for them. However, if the food is merely spread upon the ground or the surface of the snow, it attracts unwanted species of animals. To avoid these problems, bird feeders of many different types have been designed and provided with various supports and suspension. For example, they have been placed atop poles or suspended from wires or ropes to make them inaccessible to undesired animal life, particularly squirrels, which are naturally capable of reaching seemingly inaccessible points. To further deter them from reaching bird feeders, one device which has been employed is a smooth flat baffle plate which extends outwardly from the support for the bird feeder and has a surface which affords no gripping purchase to a climber. One makeshift arrangement is nothing more than a phonograph record through the central hole of which a suspension wire or rope for the bird feeder is threaded. Such a record works equally well with either a horizontal or vertical cable or wire support for the bird feeder.

A major difficulty associated with such bird feeders is that the very act of making them inaccessible to animals and squirrels often makes them equally inaccessible for filling or replenishing the feeder with bird feed. Accordingly, the primary object of the present invention is a bird feeder inaccessible to undesired wildlife but easily reached for filling or replenishing with bird feed.

A further object of the present invention is to provide an articulated support for a bird feeder which incorporates an effective baffle in its structure.

Another object of the present invention is to provide a practical but attractive bird feeder which is relatively inexpensive and simply structured.

SUMMARY OF THE INVENTION

The objects of the present invention are attained first by combining a self-levelling bird feeding station and a baffle against animals and rodents with a manually upright support referred to hereinafter variously as a staff, a post, or a support. The support consists of an articulated staff or pole in which a hinge connects the lower end of a pivotable portion to the upper end of a fixed portion, which may be embedded in the ground, is preferably surrounded by a concrete collar. The hinge includes a key to retain the pivotable portion and the fixed portion of the staff in axial alignment at which point the bird feeder is fully erected. With the key removed or disengaged, the pivotable portion of the staff may be swung downwardly to a horizontal position, presenting the bird-feeding station at a convenient point for filling or replenishing with bird feed.

The bird-feeding station is suspended by links from a frame. When the pivotable portion of the staff is swung downwardly, the links connecting the bird-feeding station to the frame are properly oriented to permit the station to maintain a horizontal position through the travel and irrespective of the angular disposition of the pivotable staff portion. Also, the baffle is so disposed relative to the frame and pivotable portion that it does not interfere in any way with filling the station.

For a better understanding of the present invention, together with other and further objects, features, and advantages, reference should be had to the following description of preferred embodiments which should be read in conjunction with the appended drawing in which:

BRIEF DESCRIPTION OF THE DRAWINGS

FIG. 1 is a perspective view of a bird feeding station in an erected position having an articulated support incorporating the present invention;

FIG. 2 is a view similar to that of FIG. 1 showing the station in a lowered position for filling; and FIG. 3 is a perspective view of the hinge which connects the fixed and pivotable portions of the support.

DESCRIPTION OF PREFERRED EMBODIMENT

In FIGS. 1 and 2, a support post 12 is seen buried in the ground, preferably to a depth of at least 2 ft., and is surrounded by a concrete collar 14 to aid in maintaining the post in an erect position. The post may be made of any one of several materials, the preferred material being standard ½" PVC piping. The post may extend upwardly for about 3 ft., and is provided with a strengthening bushing placed into the PVC pipe and shown in greater detail in a subsequent figure.

A hinge assembly 16, also shown and described in greater detail hereinbelow, is attached to the top of the fixed post portion 12. The hinge includes a pivotable portion which is attached to a second pivotable post portion 18, the hinge permitting the post portion 18 to be lowered by rotation in a plane which includes the axes of both post portions. The pivoting post portion 18 may be about 5 ft. in length and it is capped by a collar 20 which passes through a central opening formed in a flat disc 22 of aluminum or other smooth-surfaced material. Standard aluminum sheet material 1/32" in thickness has proven suitable and a diameter of 17" is effective for baffle purposes.

The collar 20, which may also be made of PVC tubing, has a shoulder formed about midway in its 2½" length. The lower small diameter portion which passes through the central disc opening is press-fitted in the top of the pivotable portion 18 and the shoulder bears upon the baffle holding it in place atop the post portion 18.

The collar 20 also has two diametrically opposite holes drilled in its upper larger portion to accommodate the bottom leg of a rectangular frame 24 which may be welded in place. The frame may be formed from ½" metal tubing and be about 14" in height and 20" in width. Pairs of linked eyebolts 28 and 30 may connect the upper leg of the frame 24 and the top of a bird-feeding station 26 at two points to maintain the station level at all times by force of gravity.

When it is desired to fill the station or replenish it with bird feed, a key or locking member is the hinge 16 is disengaged, and the upper portion 18 of the staff is swung downwardly through an angle of 90° to bring the station to a height of approximately 3 ft. where it can be easily filled or replenished with bird feed as shown in FIG. 2. Although it is not obvious as illustrated, the frame 24 preferably lies in a plane perpendicular to the plane in which the portion 18 rotates. As a result, the feeding station 26 by reason of its flexible link suspension from the frame 24 remains in a substantially horizontal position at all times.

The hinge member 16 is constructed from two pieces of 2"×2" aluminum angle material of about ⅛" in thickness. One longer piece is approximately 8" in height. There are two mounting holes 42 and 44 drilled in the longer piece of the hinge member adjacent its lower end. A pivot hole 50 is drilled approximately midway in the hinge member 46, and a key or locking hole 52 is drilled approximately 1" from the upper end of the hinge member 46. This fixed portion of the hinge is attached to the fixed staff member 12 by means of bolts (not shown) passing through the mounting holes 42 and 44.

A second smaller member 60, also formed from ⅛" aluminum angle and having an overall length of approximately 5" forms the cooperating component of the hinge 16. The component 60 is attached to the pivotable staff portion 18 by means of a bolt 61 passing through the pivot opening 50. The bolt 61 also serves as a pivot pin.

A removable key 64 preferably made of 5/6" stainless steel and bent approximately into a right angle serves to hold the hinge components fixed relative to each other. The key 64 has a pointed end for insertion into the aligned openings 52 and 65 when the device is erected. It is, of course, removed to release the station and permit it to be lowered.

Considerable detail on materials used and dimensions of parts has been given for the preferred embodiment. Other materials as well as different dimensions may be used without departing from the thrust of the invention.

Also, the locking arrangement for the fixed and pivotable support members may be made in any of several ways, the major requirement being that the feeder can be lowered to a convenient height for filling and elevated or erected to serve its purpose in feeding birds.

What is claimed is:

1. An erectable bird feeder comprising a station for holding bird feed, an articulated support post normally maintaining said station in an elevated position, said articulated support post including a fixed and a pivotable portion, a hinge member including a first angle member attached to said fixed portion and a second angle member fixed to said pivotable portion, a pivot shaft joining said fixed and pivotable portions, a retractable pin, said fixed and pivotable portions having matching openings formed therethrough for receiving said pin, removal of said pin permitting said pivotable portion to pivot relative to said fixed portion whereby said station may be lowered from said elevated position to facilitate the placement of bird feed in said station, said station includes a frame mounted rigidly atop said baffle and supported by said post, a bird feed container pivotally suspended from and within said frame, such that said container is maintained in a substantially horizontal, upright position irrespective of the axial relationship of said sections of said post.

2. An erectable bird feeder as defined in claim 1 and including a generally circular baffle wherein said post has a relatively small outside diameter and said baffle has a relatively large outside diameter, said baffle being mounted atop said post and beneath said station.

* * * * *

UNITED STATES PATENT AND TRADEMARK OFFICE
CERTIFICATE OF CORRECTION

PATENT NO. : 4,819,584
DATED : April 11, 1989
INVENTOR(S) : Dennis Rozumek

It is certified that error appears in the above-identified patent and that said Letters Patent is hereby corrected as shown below:

Column 1, line 55, after "portion" insert --of the staff. The lower end of the fixed staff portion--.

Column 2, line 27, "1/2" PVC piping" should be changed to --1 1/2" PVC piping--.

Signed and Sealed this

Twenty-fourth Day of October, 1989

*Attest:*

DONALD J. QUIGG

*Attesting Officer*  *Commissioner of Patents and Trademarks*